United States Patent [19]
Schneider

[11] 3,931,636
[45] Jan. 6, 1976

[54] BATTERY CONSERVATION SYSTEM FOR COLOR TELEVISION CAMERA

[75] Inventor: Hans Dieter Schneider, Gross-Gerau, Germany

[73] Assignee: Robert Bosch Fernsehanlagen G.m.b.H., Darmstadt, Germany

[22] Filed: Apr. 29, 1974

[21] Appl. No.: 465,157

[30] Foreign Application Priority Data
May 18, 1973 Germany.............................. 2325193

[52] U.S. Cl............... 358/10; 178/DIG. 11; 358/50
[51] Int. Cl.²........................ H04N 9/62; H04N 9/09
[58] Field of Search............... 178/DIG. 11, DIG. 4; 358/10, 41, 50, 51, 52; 315/160, 169 TV; 325/492, 186

[56] References Cited
UNITED STATES PATENTS
2,594,383  4/1952  Bedford ................................ 358/10
3,603,732  9/1971  George ......................... 178/DIG. 11

Primary Examiner—Robert L. Griffin
Assistant Examiner—R. John Godfrey
Attorney, Agent, or Firm—Littlepage, Quaintance, Murphy & Dobyns

[57] ABSTRACT

A portable battery operated color television camera is provided with a switch system for use to preserve power while testing the camera and associated equipment or while engaged in standby operation. The switch system removes the power from two of the three pickup tubes in the camera, thereby reducing power consumption while allowing testing or standby operation in a black-and-white mode.

8 Claims, 1 Drawing Figure

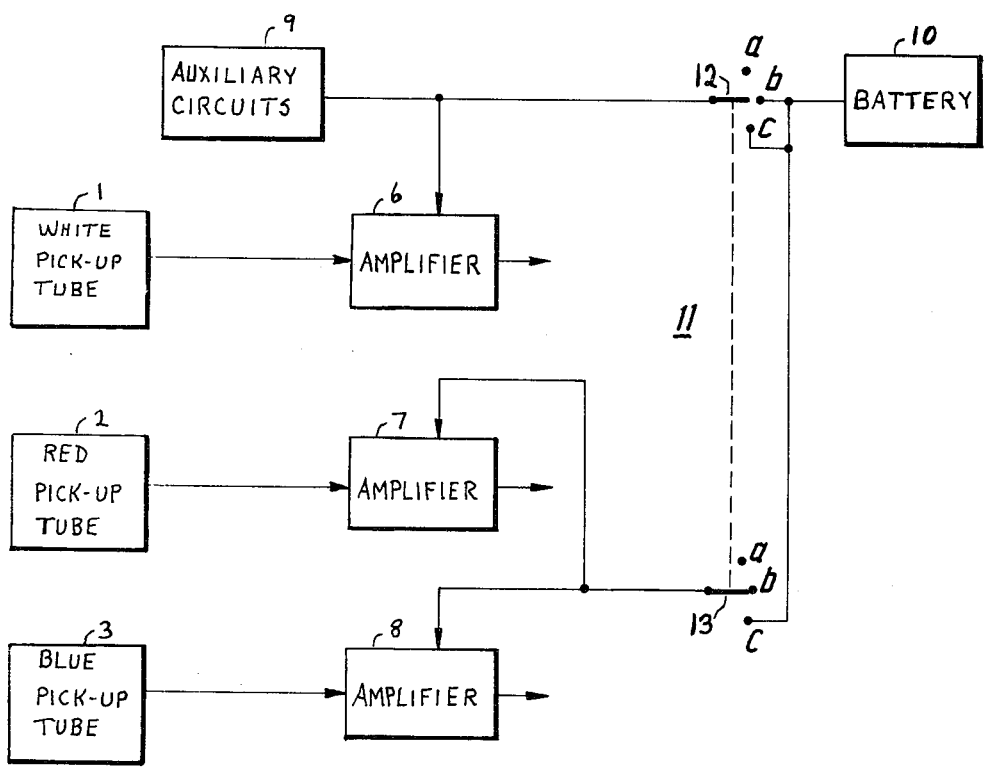

BATTERY CONSERVATION SYSTEM FOR COLOR TELEVISION CAMERA

BACKGROUND OF THE INVENTION

1. Field of the Invention

The invention relates to a color television camera for battery operation.

2. Description of the Prior Art

In battery-operated portable color television cameras, the prevailing problem is essentially one of energy supply, since the ratio of battery weight to possible length of operation of the camera ought to be minimized. This minimization can generally be helped by use of suitable circuit technology, but there are certain limits to what can be accomplished by this means.

SUMMARY OF THE INVENTION

The invention therefore provides a color television camera by means of which an additional extension of the possible time of operation can be obtained.

According to the invention, a switching device is provided in a color television camera, preferably for battery operation, whereby the camera can be switched optionally from normal operation to test operation or stand-by operation. In this test operation or standby operation, an operating voltage is fed only to the circuit sections necessary for the production of a black-and-white signal and for the operational manipulation.

BRIEF DESCRIPTION OF THE DRAWING

The invention will now be explained in detail with the aid of an embodiment shown in the sole FIGURE wherein only those parts of a color television camera are shown which are essential for the invention.

DESCRIPTION OF THE PREFERRED EMBODIMENT

For generating a color picture signal, three picture taking or pick-up tubes are provided. Tube 1 is provided for white light, tube 2 is provided for red light, and tube 3 is provided for blue light. Corresponding amplifiers 6, 7, and 8 are provided to amplify the video signals from tubes 1, 2 and 3. Furthermore, the auxiliary circuits 9, which may include telephony, lens control such as focusing, and a view finder, are mounted in the camera. A battery 10 is provided for use as an energy supply and is preferably also mounted in the camera.

According to the invention, a switching device 11 is provided which consists of a switch 12 and a switch 13, each with three contacts $a$, $b$, $c$. The contacts 12a and 13a are without connection to other elements, such that, in this position of switches 12 and 13, the television camera is switched off. Contact 13b of switch 13 is likewise without connection, while contact 12b of switch 12, together with contacts 12c and 13c of switches 12 and 13 are connected to battery 10.

In the center (illustrated) positions 12b and 13b of switches 12 and 13, used for test operations or standby, the white channel with picture-taking tube 1 and amplifier 6, together with auxiliary circuits 9, are therefore connected to the voltage supply of the battery, whereas color channels for red and blue are out of operation. In the normal operation mode, (switch position $c$), all channels of the camera are connected to battery 10. While in normal operation mode of the camera, a color picture signal is produced, but in the test operation mode, the camera produces only a black-and-white signal which is fed to the master control panel and to the cameraman as a view-finding signal.

Because substantially fewer circuits are in operation in test operation mode, large reduction from the normal operation levels of the camera results. This reduction leads to an extension of the time of operation in test or standby, which may be doubled or tripled.

With this black-and-white operation it is possible to test most focusings. At the few focusings at which a color picture must be produced in the test operation, too, this is possible by actuation of the switching device mounted on the television camera. The auxiliary circuits include those needed for maintaining black-and-white operation and those needed for manipulation of the camera itself.

What is claimed is:

1. In a portable color television camera designed for operation from a limited self-contained energy source and comprising three pick-up tubes for producing video signals from different spectral components of a color image, three amplifier means respectively connected for amplifying video signals from the three pick-up tubes, and auxiliary circuitry for use in connection with the camera, the improvement comprising selectively operable switch means for reducing power consumption by causing the camera to operate to produce only a black-and-white video signal when a color video signal from all three pick-up tubes is not required.

2. A camera according to claim 1, wherein the limited energy source is a battery.

3. A camera according to claim 2, wherein the three tubes comprise a white tube in a white channel, a red tube in a red channel, and a blue tube in a blue channel.

4. A camera according to claim 3, wherein only the elements in the white channel and the auxiliary circuits are operated during a test mode to provide a black-and-white video signal, and wherein the elements in the red channel and the blue channel are operated in addition during a normal operation mode to produce a color video signal, the switch means being selectively operable to switch between the test mode and the normal operation mode.

5. A camera according to claim 4, wherein the switch means comprises first and second switches, each of three contact positions, ganged together, the first switch being connected when supplied with power to supply power from it to the white channel and to the auxiliary circuits, the second switch being connected when supplied with power, to supply power from it to the red channel and to the blue channel, the two switches being ganged such that, when both switches are in their first contact position, no power is supplied to either switch and the camera is off, when both switches are in their second contact position, power is supplied only to the first switch, whereby power is supplied only to the white channel and to the auxiliary circuits to produce a black-and-white video signal, and when both switches are in their third contact position, power is supplied to both switches, whereby power is supplied to all three channels and to the auxiliary circuits to produce a three-channel color video signal.

6. A method of operating a portable television camera including three color channels and auxiliary circuits in order to conserve power, comprising the steps of:

A. providing operating power to the auxiliary circuits and to only one of the color channels and providing no operating power to the other two color channels while testing the camera to generate a black-and-white video signal from the camera, and B. providing operating power to all three color channels and to the auxiliary circuits when the camera is in ordinary operation to generate a three-channel color video signal from the camera.

7. In a portable color television camera designed for operation from a limited self-contained energy source and comprising three pick-up tubes for producing video signals from different spectral components of a color image, three amplifier means respectively connected for amplifying video signals from the three pick-up tubes, and auxiliary circuitry for use in connection with the camera, the improvement comprising selectively operable switch means for selectively causing the camera to operate to produce only a black-and-white video signal or to produce a color video signal from all three pick-up tubes, whereby the use of power is reduced when only a black-and-white video signal is produced, thereby reducing depletion of the energy source when a color video signal is not required.

8. In a portable color television camera designed for operation from a battery and comprising:
A. three color-channel means operable by power from the battery to produce three corresponding video signals in three corresponding channels respectively representative of different spectral components of a color image, each color-channel means comprising a pick-up device and amplification means responsive to the pick-up device for producing a respective one of the three video signals, and
B. auxiliary circuitry for use in connection with the camera,
the improvement comprising
C. a switch having at least first and second selectable conditions, the switch when in the first condition providing a connection by which operating power is applied from the battery to all three color-channel means and to the auxiliary circuitry, and the switch, when in the second condition providing a different connection by which operating power is applied to only one of the three color-channel means and is applied to the auxiliary circuitry.

* * * * *